United States Patent [19]

Cone et al.

[11] 3,965,860

[45] June 29, 1976

[54] PLYWOOD MANUFACTURE USING FOAMED GLUES

[75] Inventors: Charles N. Cone, Portland; Julius M. Steinberg, Hillsboro, both of Oreg.

[73] Assignee: Pacific Adhesives, Inc., Hillsboro, Oreg.

[22] Filed: Mar. 23, 1973

[21] Appl. No.: 344,200

Related U.S. Application Data

[60] Division of Ser. No. 80,961, Oct. 15, 1970, abandoned, Continuation-in-part of Ser. No. 839,481, July 7, 1969, abandoned.

[52] U.S. Cl. ................................ 118/612; 118/315; 222/190; 222/330; 222/485; 261/28

[51] Int. Cl.$^2$ ...................... B05C 11/10; B32B 5/18

[58] Field of Search .............. 156/78; 118/612, 608, 118/25, 410, 411, 315; 222/190, 485, 330; 259/DIG. 30; 15/50 C, 50 R, 98; 239/551, 562, 563, 564; 425/466; 261/28

[56] References Cited

UNITED STATES PATENTS

| | | | |
|---|---|---|---|
| 2,731,253 | 1/1956 | Spencer | 259/DIG. 30 |
| 2,749,005 | 6/1956 | Plusquellic | 222/485 X |
| 2,791,353 | 5/1957 | Dorn et al. | 222/485 X |
| 2,982,995 | 5/1961 | Groleau | 118/410 X |
| 3,112,527 | 12/1963 | Pankratz et al. | 425/466 |
| 3,224,411 | 12/1965 | Blaha et al. | 118/411 X |
| 3,239,100 | 3/1966 | Peterson | 222/334 X |
| 3,377,655 | 4/1968 | Kucharski et al. | 425/466 |
| 3,408,981 | 11/1968 | Poppe et al. | 118/25 |
| 3,428,985 | 2/1969 | Boyd | 15/50 C |
| 3,452,710 | 7/1969 | Hentschel | 118/315 X |

*Primary Examiner*—John P. McIntosh
*Attorney, Agent, or Firm*—Eugene D. Farley

[57] ABSTRACT

Plywood is made by continuously propelling a liquid plywood glue in unfoamed condition at a predetermined flow rate, continuously foaming the glue as it is propelled, and continuously extruding or otherwise applying the foamed glue to the surface of a plurality of wood veneers. The flow rate of the unfoamed and foamed glue is maintained substantially the same on a unit weight of liquid glue per unit time basis. The veneers then are laid up into a plywood assembly and pressed into a plywood panel. The veneers may be preheated to expedite setting of the glue. The method is applicable generally to the application of a foamed liquid to a solid surface.

11 Claims, 14 Drawing Figures

96
110
100
106
98
114
102
72
108
104

140
118

70
62
86
78
112
6
7
74

PLYWOOD MANUFACTURE USING FOAMED GLUES

This application is a division of application Ser. No. 80,961, filed Oct. 15, 1970, now abandoned, the same being a continuation-in-part of the patent application of Charles N. Cone and Julius M. Steinberg, Ser. No. 839,481, filed July 7, 1969, now abandoned for Plywood Manufacture Using Foamed Glues.

This invention relates to the application of foamed liquids to solid surfaces. It relates in particular to the manufacture of plywood by the application of foamed liquid plywood glues to wood veneers followed by forming the veneers into a plywood assembly and pressing the assembly into a plywood panel.

In the classic method of plywood manufacture, wood veneers are coated with a suitable adhesive in a roll coater, spray coater, or curtain coater. The veneers are formed into a plywood assembly using the desired layup pattern after which the assembly is cold pressed or hot pressed to set the glue and form the plywood panel. This procedure, though ancient and widely used, still is beset with troublesome problems.

Although in order to shorten press times, it is desirable to spread the glue on hot veneers, this has not been possible because of rapid glue dryout and premature glue setting. As a consequence, in the manufacture of hot press plywood, the anomalous and inefficient procedure has developed of heating the green veneer to dry it, cooling the hot dry veneer, spreading it with glue and assembling, and then reheating the resulting assembly to set the glue.

It has been impossible to spread the veneers with glues characterized by a degree of activity above a certain level. This is for the reason that glue is held up in the roll coater, or overspray is recirculated in the spray or curtain coater, with the result that in each instance some of the glue applied to the veneers is old glue, held in the system beyond the permissible time allowance.

In the roll coater, it is impossible accurately to control the applied glue spreads. The spread is influenced by veneer thickness and veneer surface qualities. These are variable factors.

Since press times are relatively long, the output of a given mill is determined not by the time required for assembling the veneers, but rather by the capacity of its presses.

In hot press plywood manufacture, blistering and veneer over-heating are problems. Because of the poor thermal conductivity of wood, it is necessary to overheat the exterior surfaces of the panels. This drives the moisture to the center of the panel and causes blistering.

Glue foaming, inadequate pot life and adverse time-viscosity relationships present difficult problems.

Plant layup and press cycles are restricted by practical considerations of available equipment personnel, glue limitations, etc.

Glue is waster by the necessity of overspreading to compensate for thick and thin veneers and glue dryout.

Methods of glue application are not correlated with new techniques for mechanized layup and automatic plywood production.

It is the general purpose of the present invention to provide method and apparatus for the manufacture of plywood and like products which overcome the foregoing problems.

In the accomplishment of this purpose, a method is practiced which is the exact opposite in many important respects of the conventional method of making plywood.

In the conventional method, chemicals are added and procedures and equipment modified to prevent the glue from foaming. In the present method, it is foamed intentionally and performs valuable functions in the foamed condition.

In the conventional method of hot pressing, thick veneers are disadvantageous since they insulate the glue line from heat. In the present method, thick veneers are desirable, or at least not disadvantageous since they provide a greater capacity for storing heat.

In conventional hot pressing the press time is a direct function of the thickness of the panel. In the present method, the press time is independent of panel thickness. In ordinary hot pressing, production capacity is limited by the number of press openings available. In the present system, a single press opening can handle all of the panels that possibly can be assembled during a given pressing cycle.

In conventional hot pressing, in order to heat the center of each panel, the exterior portions are heated to temperatures above that required to cure the glue bond. This results in deterioration and panel blistering. In the present method, no portion of the panel need be heated above the glue-curing temperature.

The manner of practicing the present invention will be apparent from the accompanying specification and claims considered together with the drawings, wherein:

Figure 1:
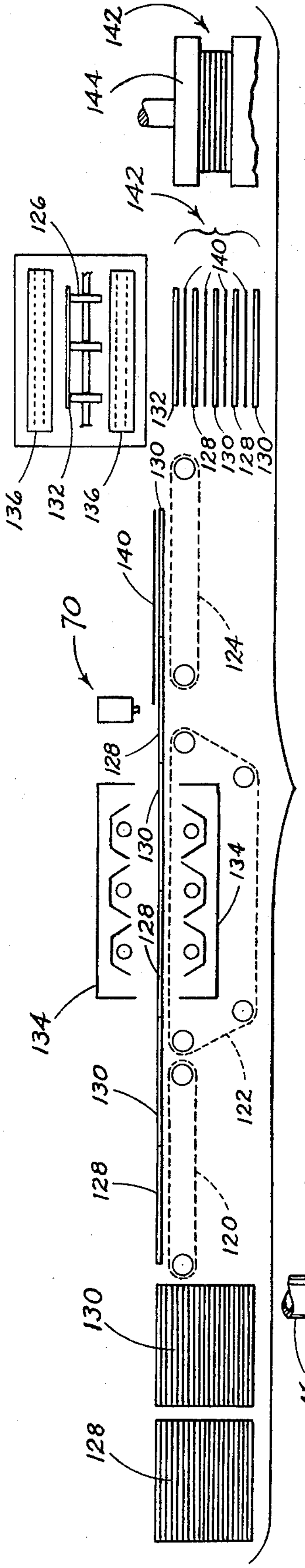
FIG. 1 is a schematic view illustrating a plywood manufacturing line incorporating the presently described method and apparatus.
Figure 2:
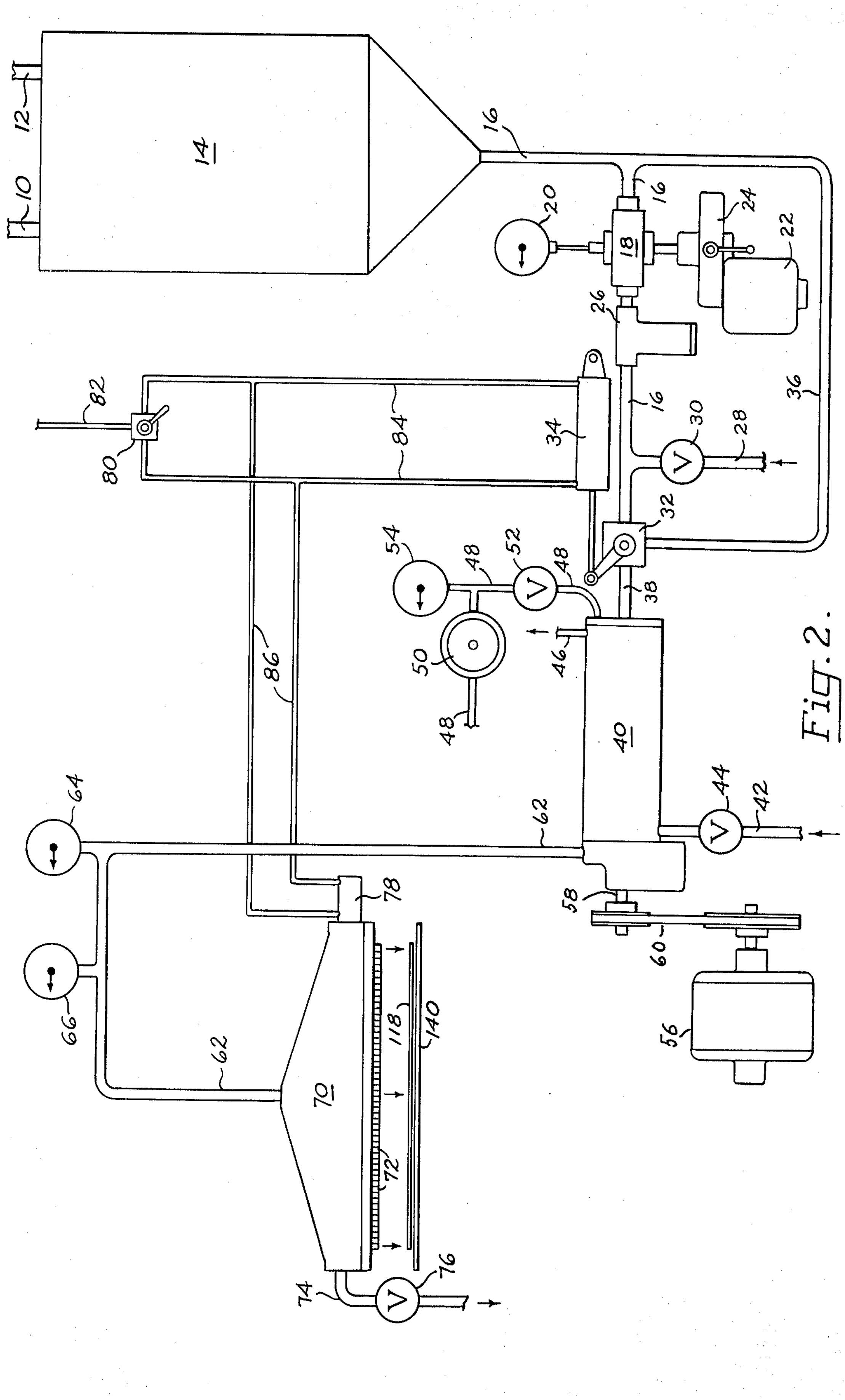
FIG. 2 is a schematic view of liquid foaming apparatus, such as may be incorporated in the plywood manufacturing line of FIG. 1.
Figures 10, 11, 14:
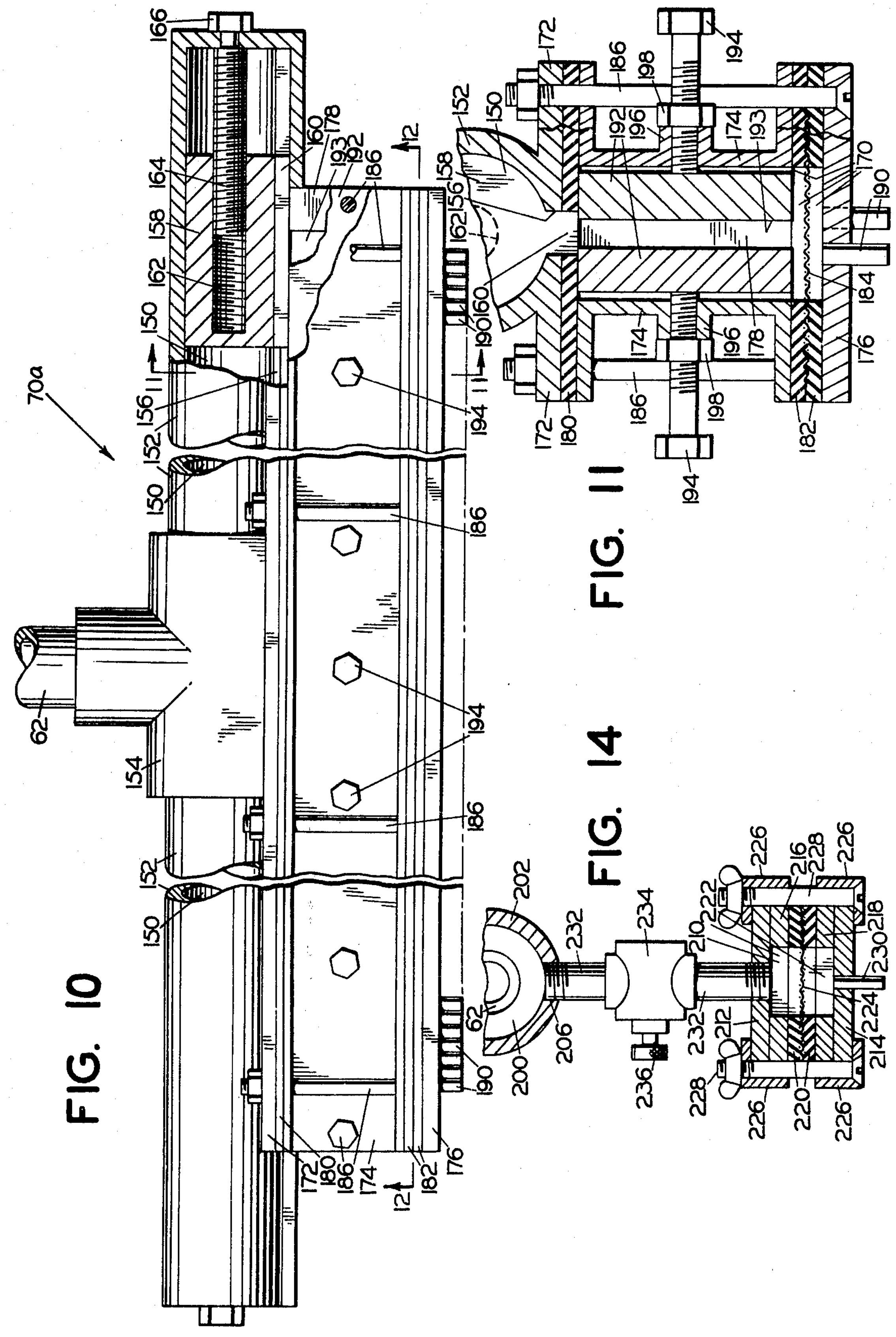
Figure 12:
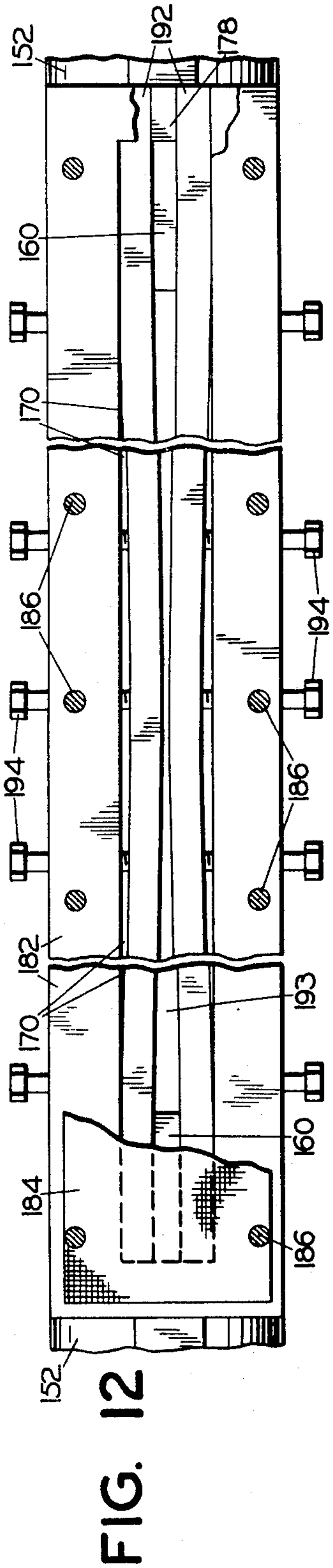
Figure 13:
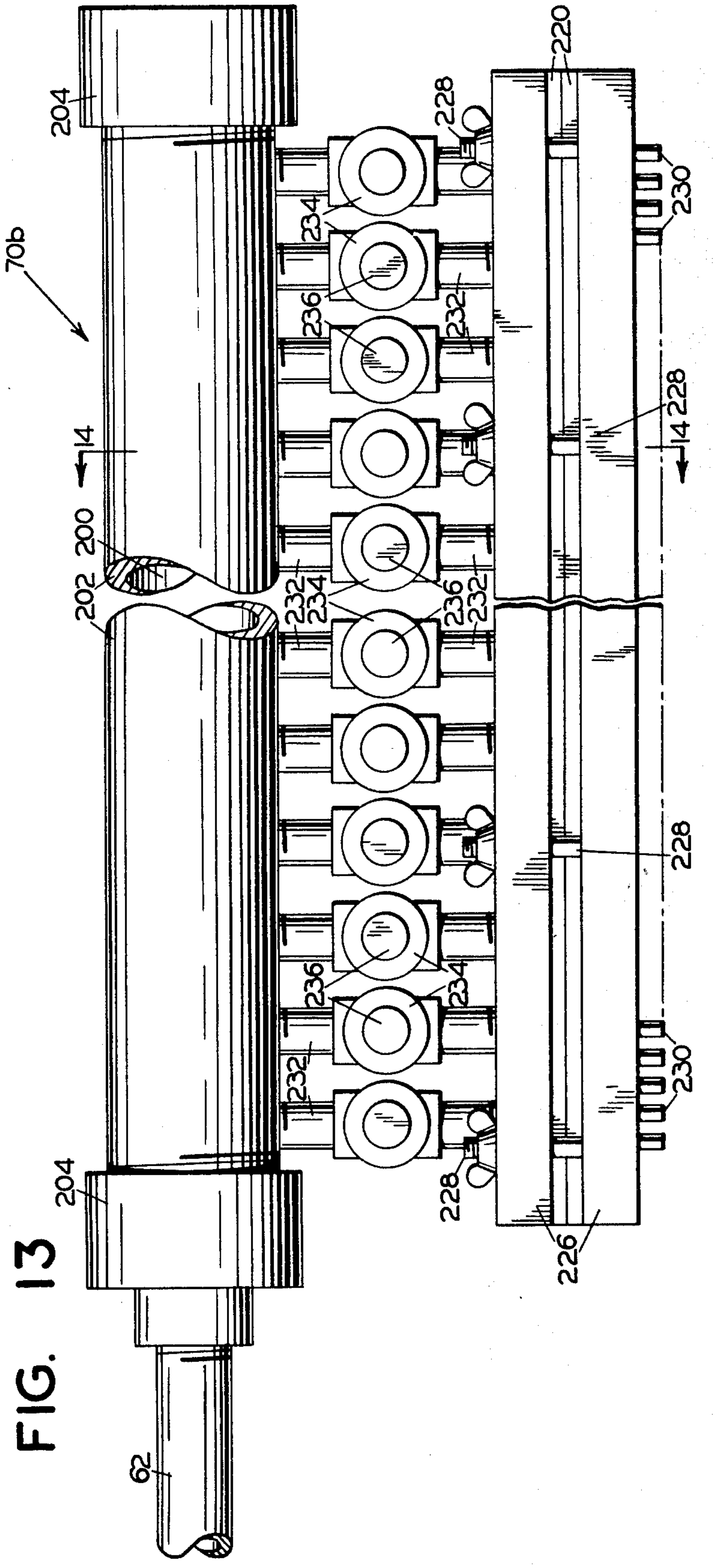

FIGS. 10, 11 and 12 are views in fore-shortened side elevation, partly in section, transverse cross section, and longitudinal cross section, respectively, of an alternate foamed liquid extruding head which may be employed in the systems of FIGS. 1 and 2; and FIGS. 13 and 14 are views in fore-shortened side elevation and transverse section, respectively, of still another extruding head applicable to the purpose of the invention.

In FIG. 2 there is illustrated schematically apparatus by means of which a liquid plywood glue, or other liquid, may be converted to a foam useful in the practice of the presently described method.

The liquid is fed by infeed lines 10, 12 into a unit 14 which may comprise a storage tank, or an inline mixer. It is a particular feature of the invention that it lends itself to the inline mixing of the components of the liquid to be foamed. In this application, the component ingredients of the liquid are fed, each at its appropriate rate into an inline mixer of suitable design. This initiates the flow of liquid into the line toward the foamer.

The use of inline mixing has the advantage that the liquid is always freshly mixed and of constant age when it reaches the foaming unit, and also when it reaches the surface to which it is to be applied. In the manufacture of plywood, this makes possible the use of formulations not operable in conventional procedures beacuse of short plywood glue pot life. It also contributes to uniform glue spreading because the glue always is at the same age when it arrives at the spreading station.

In some instances the liquid components may be proportioned directly into the line with the object in view of permitting the downstream foaming unit to accomplish the mixing.

Whether the liquid is prepared batch-wise, by means of an inline mixer, or by being directly proportioned into the line, it next is propelled through the system at a predetermined, constant rate.

In the illustrated form of the invention, the liquid contained in unit 14 is drawn into line 16 by means of a positive displacement pump 18. This key unit of the assembly may comprise a gear pump of suitable design equipped with a tachometer 20 capable of indicating accurately the pump output.

The pump is driven at the desired rate by means of a motor 22 connected to the shaft of the pump through a variable speed transmission 24.

Line 16 also includes a strainer 26 and a branch line 28 with control valve 30. Line 28 may be used to introduce into the flow at a controlled rate a material which can not be introduced into unit 14. Such a material might comprise, for example, a catalyst to be mixed with a plywood glue. Since it is introduced into the system just before the foamer, only a few seconds elapse between the time of introduction and the time of application. This interval is so short that the added material does not exert an adverse influence, even though it may be highly reactive.

The method liquid next passes through a three-way valve 32. In the exemplary embodiment, valve 32 is controlled by an air cylinder 34. In the first position of the valve the pumped liquid is shunted to a by-pass line 36 which recirculates it through the pump. In the second position of the valve, the liquid is directed through line 38 to the foaming unit 40.

Foaming unit 40 is jacketed and supplied with temperature control water through an inlet line 42, with control valve 44, and an outlet line 46. It thus is possible to control the temperature of the foamed liquid to whatever level is indicated by the properties of the liquid and the conditions of its foaming.

Air, nitrogen or other suitable gas is introduced under pressure into foaming unit 40 through line 48. Its pressure and amount are controlled by a regulator valve 50, a needle valve 52, and a pressure gauge 54.

The foaming unit is powered by a motor 56 which drives the shaft 58 of the unit through a belt and pulley assembly 60.

The control of the amount of air supplied to foaming unit 40 is important. In general, as much air is supplied to the foaming unit as the liquid will accept. This in turn depends upon the nature of the liquid and the manner of operation of the foaming unit. If too much air is introduced, a non-uniform foam is produced in that it contains pockets of air which escape from the foam as undesirable large bubbles when the foam is released from the system.

In general, in the manufacture of foamed plywood glue using the system of FIG. 2, the relative amounts of air and liquid admitted to the foaming unit are regulated in such a manner as to produce a foam having a weight to volume ratio of from 0.20 to 0.25 grams per cc. Since the unfoamed liquid glue has a density of about 1.15, the net effect is to expand the glue to from 4 to 6 times its original volume by converting it to a foam.

Since the foamed product is driven by the positive drive of pump 18, it moves out of the foaming unit at the same rate that it enters, in terms of pounds per minute. However, in terms of cubic inches per minute it moves out about five times as fast as it enters.

The foamed liquid leaving foaming unit 40 passes through a line 62 which includes a temperature gauge 64 and a pressure gauge 66.

Line 62 discharges the foamed liquid into an extruder 70.

Extruder 70 is equipped with a series of nozzles or jets 72 by means of which the foamed liquid is applied to a substrate. It also is equipped with a discharge line 74 with valve 76 which discharges waste material or wash water to the waste disposal system.

Extruder 70 is fitted with valve means, to be described later, which regulates the flow of foamed liquid to one of the other of these discharge systems. The valve means is controlled by an air cylinder 78 connected in parallel to the same piping which supplies air under pressure to cylinder 34. The flow of air to both cylinders is controlled by a valve 80.

Thus air under pressure passes from a common line 82 to pipes 84 supplying cylinder 34, and to pipes 86 supplying cylinder 78. When valve 80 is adjusted to one of its positions, cylinders 34, 78 initiate the flow of liquid through foaming unit 40 and extruding head 70 simultaneously. When the valve is adjusted to its second position, the flow of liquid through foamer 40 and foamed liquid through extruder 70 simultaneously are cut off. This insures positive control of the system.

Figure 3:
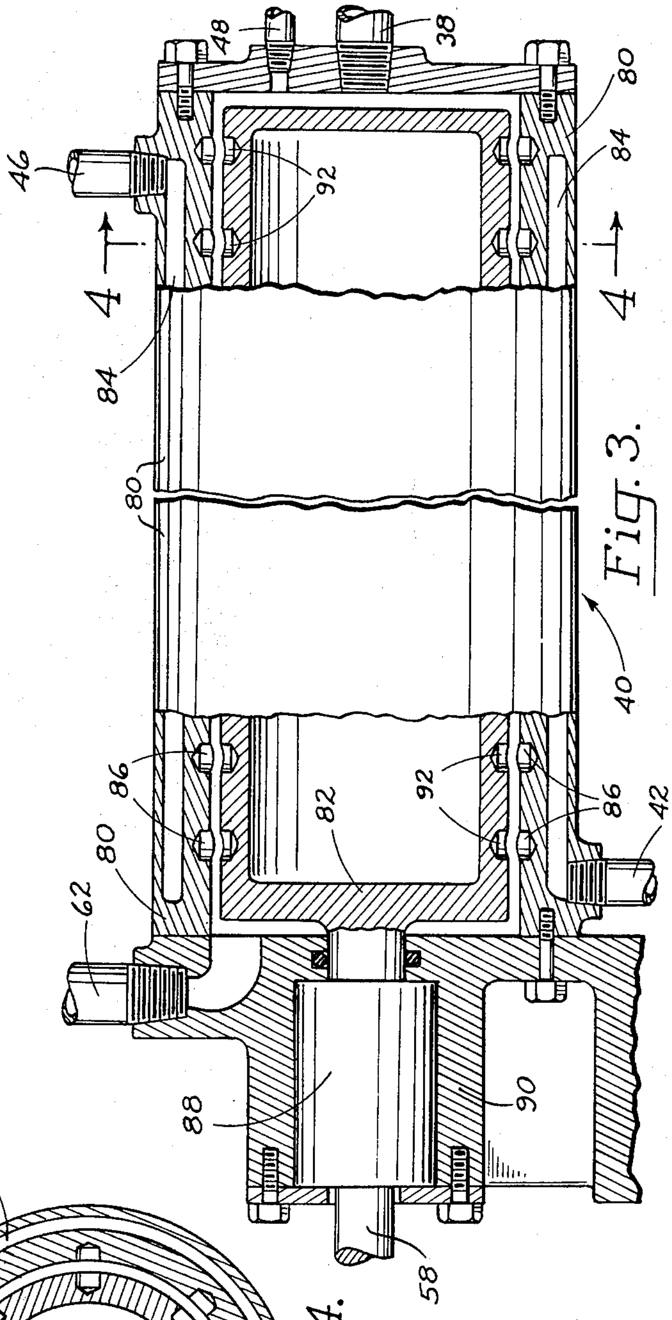
FIGS. 3 and 4 are views in longitudinal and transverse section, respectively, FIG. 4 being taken along line 4—4 of FIG. 3, both illustrating the construction and manner of operation of a liquid foaming unit which is one of the elements of the foaming system of FIG. 2.
Figure 4:
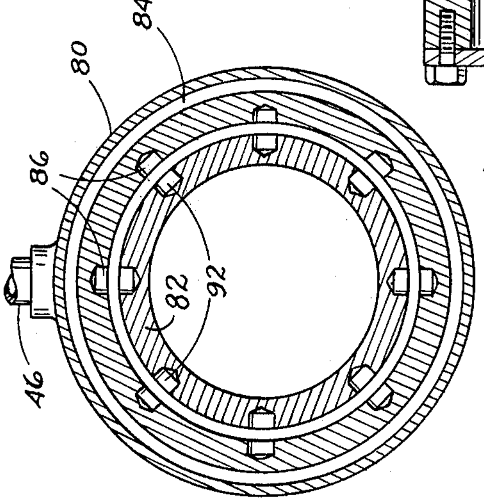

The construction of a suitable foaming unit 40 is shown in greater detail in FIGS. 3 and 4.

As noted, the foaming unit has for its object the conversion of liquid introduced through line 38 into a stable foam. The herein described foaming unit has the virtue of accomplishing this result rapidly, on a continuous high volume basis, and with the production of a foam of remarkable stability from a wide variety of liquids.

The foaming unit basically comprises an outer case or stator 80 and a rotor 82.

Stator 80 may be generally cylindrical in contour. It is provided with a water jacket 84 fed with cooling water through infeed water line 42 and outfeed water line 46. It also is provided with connections for liquid infeed line 38, liquid outfeed line 62 and air infeed line 48.

The stator is hollow and provided around its inner periphery with a plurality of spaced recesses 86.

Rotor 82 is mounted on shaft 58, driven by motor 56. The shaft is supported at one end of the rotor by means of a stout bearing 88 contained in a bearing housing 90, bolted to one end of stator 80.

Rotor 82 is cylindrical in outline and dimensioned to be received within the hollow stator, with a suitable clearance, for example a clearance of about 1/16 inch, being present betweenn their respective surfaces.

The outer peripheral surface of the rotor is formed with a plurality of recesses 92. These are spaced in a pattern corresponding to the pattern of the recesses 86 in the stator, so that during the rotation of the rotor, the recesses in the surfaces of rotor and stator momentarily sweep across each other.

The net result is to provide an almost explosive agitation of the liquid and gas introduced into the foaming unit. As the liquid enters through line 38 at one end of the unit it is mixed with a metered amount of air entering through line 48. The two components then pass through the unit in the direction of the axis of rotation of the rotor and exhaust via line 62. As they traverse the unit they are subjected to violent agitation of the character described which results in the large scale, rapid production of a stable foam.

In the alternative, recesses 86, 92 may be replaced by longitudinally extending grooves in the respective surfaces of rotor and stator.

Figures 5, 6, 7, 8, 9:
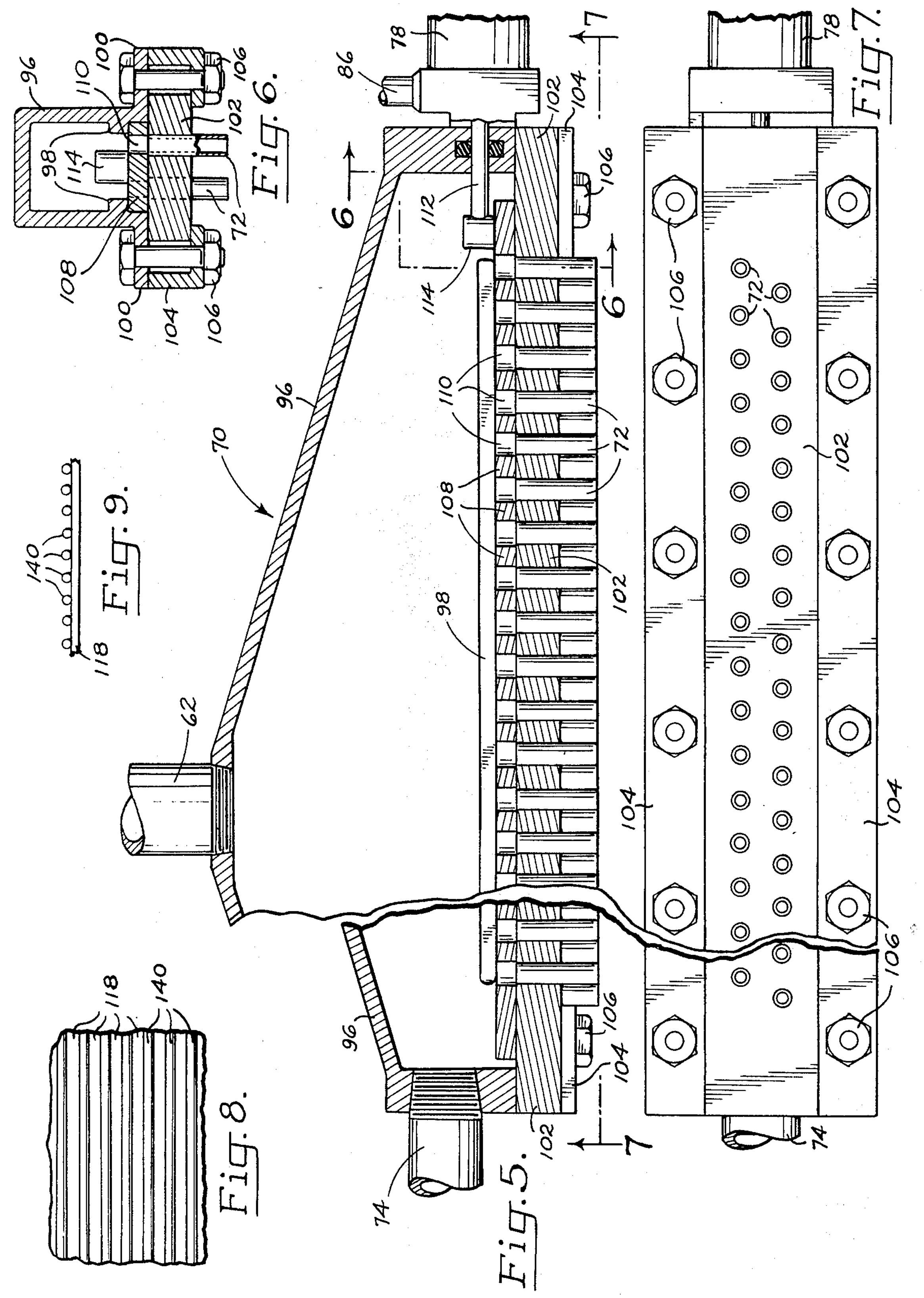
FIGS. 5, 6 and 7 are views in longitudinal section, bottom plan, and transverse section, respectively, of a foamed liquid extruding unit such as may be employed in the systems of FIGS. 1 and 2.
FIGS. 8 and 9 are fragmentary detail views in plan and end elevation, respectively, of a wood veneer sheet upon which foamed liquid glue has been extruded in accordance with the method of the present invention.

The construction of a suitable extruding unit 70 is shown in detail in FIGS. 5, 6 and 7.

The extruding unit comprises a case or head 96 of the desired contour. Where the extruder is to be used in the application of plywood glue to a wide sheet of wood veneer, the case may have a length determined by the width of the veneer sheet and a width determined by the dimensions and number of the extruding nozzles.

Case 96 is closed on the top and on all four sides, but open on the bottom. Its longitudinal side walls are provided with retainer strips 98. Extending outwardly from its lower margins are longitudinal flanges 100.

A heavy plate 102 is detachably mounted on the lower side of the case, opposite its lower open end. The plate may be variously retained in position, but as shown, may be retained by means of angle irons 104 secured by bolts 106 penetrating flanges 100.

Plate 102 mounts a plurality of extrusion nozzles 72, FIGS. 2 and 5. These are dimensioned and shaped as desired to determine the size and contour of the extruded filaments of foamed liquid. For many applications they desirably may be round in cross section. They are arranged preferably in two rows in staggered relation to provide a complete coverage of extruded material on the substrate on which the material is to be applied.

Valve means having the virtue of positively starting and stopping the flow of extruded material through the nozzles is provided.

In the illustrated form of the invention, such means comprises a sliding valve plate 108 having perforations 110 spaced and dimensioned to register with discharge nozzles 72. Valve plate 108 is slidably maintained in position between the upper surface of plate 102 and the lower surfaces of flanges 98.

It is adjustable between two positions. To this end the piston rod 112 of cylinder 78 extends through a side wall of case 96 and is connected to a lug 114 extending upwardly from one end of plate 108. Cylinder 78 adjusts the valve plates between a valve open position in which perforations 110 through the plate register with nozzles 72, and a valve closed position wherein the two sets of openings are out of registration with each other.

Foamed liquid discharged through nozzles 72 may be applied to a wood veneer sheet 118 conveyed beneath the extrusion head on a conveyor 120, FIG. 2.

As related above, the pattern and size and shape of the extruded material is determined by the arrangement, size and shape of the extruding nozzles. A typical pattern and distribution useful in the manufacture of plywood is illustrated in FIGS. 8 and 9.

As shown in these two figures, where nozzles 72 are round, the coherent foamed liquid is deposited in the form of filaments or rods 140 of circular cross section. By virtue of the manner of application, they extend substantially parallel to each other. Their lateral spacing is determined by the lateral spacing of the nozzles. In a typical instance it may run from ⅛ inch to ½ inch. The diameter of the filaments may vary, for example from 1/64 inch to ⅜ inch. It is to be observed that where the filaments are circular in cross section, the contact between the under surface of the filaments and the upper surface of the substrate is kept at a minimum. This is important because it reduces the tendency of water or other liquid to flow from the filaments into the substrate.

It also is to be observed that the filaments are sufficiently stable so that they remain in their FIG. 9 uncollapsed condition for a substantial period of time. This is important because it enables filaments of different reactive materials to be applied to the same substrate, as will be discussed more fully hereinafter.

It further is to be observed that the foamed liquids of which the filaments are comprised do not flow as do fluids. They are thixotropic and of very low density. Neither gravitational force nor momentum contributes much to their flow patterns. For any given foamed liquid, the rate of flow through a specific opening will depend mostly on the shape of the opening and the pressure differential between its entrance and its exit.

This property of foamed liquids creates a peculiar problem in the manufacture of plywood wherein the head employed for extruding the filaments usually is over four feet long and may be over eight feet long. In this application, an extrusion head having the design of that illustrated in FIGS. 5, 6 and 7 tends to discharge foamed adhesive at different rates along its length. In general, the rate of discharge is greatest in the middle of the extruding head and diminishes toward each end to a minimum occuring a spaced distance inwardly from the ends of the head. The rate of discharge then increases observably toward the extreme ends of the head. This situation is disadvantageous in that it results in uneven application of foamed adhesive to the veneer surfaces.

The extrusion heads illustrated in FIGS. 10 to 14 inclusive overcome these problems. Each in essence comprises two laterally elongated chambers which preferably lie parallel to each other. The foamed liquid is piped into one of these chambers and the extrusion openings feed out from the other one.

The two chambers are connected along their length by conduit means of such a nature that the flow from one chamber to the other may be regulated independently along different portions of the chambers. This in turn controls the discharge from the extrusion openings which accordingly may be rendered uniform along the width of the head.

In the embodiment of FIGS. 10, 11 and 12, a discharge head, indicated generally at **70*a*,** is illustrated in which the two chambers are connected through a slot — like a conduit in two sections: a first section in the upper chamber and communicating second section in the second chamber. Means are provided for adjusting the effective length of the first section and the effective width of the second section thereby adjusting the flow from one chamber to the other. This in turn controls the discharge from the extrusion openings in the second chamber.

The first chamber 150 preferably is cylindrical and may be fabricated from two lengths of pipe 152 the outer ends of which are closed and the inner ends of which are connected to a T-connector 154 which communicates with feed pipe 62. The latter in turn is connected to a source of foamed liquid under pressure.

The bottom of the pipe is provided with a longitudinal slot 156 which serves both as a guideway and as the first section of the conduit between the two chambers.

Means are provided for adjusting the effective length of slot 156.

In the illustrated form of the invention such means comprise gate means which adjustably block off more or less of the end portions of the slot.

The gate means comprise cylindrical slides 158, one located at each end of chamber 150. Each slide has a key 160 which is received in a terminal guideway portion of slot 156.

The interior of each sliding gate member has a threaded blind opening 162 which receives a screw 164. The latter extends through the end wall of chamber 150 and is fitted with a head 166 by means of which the screw may be turned. This adjusts correspondingly the longitudinal position of the gate member within the chamber.

The effective open portion of slot 156 thus provides a conduit section of variable width which interconnects chamber 150 with a cooperating chamber 170.

Chamber 170 is contained in a housing defined by a top which may comprise flanges 172 extending laterally outwardly from hollow cylinder 152, a pair of opposed channel members 174 which form side walls, a perforated bottom plate 176 and a pair of end pieces 178. An upper seal 180 is interposed between flanges 172 and channel members 174. A divided seal 182 is interposed between channel members 174 and bottom plate 176. A filtering screen 184 is interposed between the components of divided lower seal 182. It has for its function filtering out over-sized solid particles which might interfere with the extrusion of the foamed liquid.

The entire chamber assembly then is demountable assembled by means of bolts 186.

A plurality of extrusion nozzles 190 are pressed into the perforations of bottom plate 176. In the illustrated form of the invention, these are arranged in two staggered rows.

The flow of foamed liquid through extrusion nozzles 190 is controlled in part by adjusting the length of slot 156. It is further controlled by providing within the housing a conduit section 193 of adjustable width which communicates with slot 156 at one end and with chamber 170 at the other.

This conduit section is defined by a pair of flexible plates 192 which may be made of nylon, teflon, or other inert, flexible material. The plates extend substantially the entire length of the housing in laterally spaced relation, forming the slot 193. They are supported at their ends by terminal bolts 186.

The spacing between the two plates determines the flow into the chamber. This spacing is adjustable along the length of the plates by means of a plurality of adjustment bolts 194 threaded into bosses 196 extending laterally outwardly from the central portions of channels 174. The ends of bolts 194 bear against the outer side faces of plates 192. The bolts are secured in their selected adjustment positions by means of lock nuts 198.

The entire assembly thus acts as a valve which controls the flow and distribution of foamed liquid through the extruding head as required to provide a predetermined or uniform discharge through discharge openings 190.

Foamed liquid under presssure supplied by pipe 62 fills chamber 150 and passes through communicating slots 156, 193 into chamber 170, then passes through chamber 170 and out nozzles 190 in a flow controlled by the setting of gate members 158, which determine the length of slot 156, and the setting of screws 194, which determine the width of slot 193. This provides the desired flow pattern.

A similar result is achieved by extrusion head **70*b*, the construction of which is illustrated in FIGS. 13 and 14.**

Foamed liquid under pressure is introduced into a first, laterally elongated chamber 200 which may be simply constructed of a pipe 202 fitted with end walls 204 and provided with a plurality of spaced openings 206.

A second laterally elongated chamber 210 is defined by a perforated upper plate 212, a perforated bottom plate 214, filler plates 216, 218, a divided seal 220, and end pieces 222. A filter screen 224 is interposed between the components of divided seal 220. Upper and lower angle iron clamping members 226 with associated bolts 228 demountably secure the component parts of the chamber in their assembled condition.

Discharge nozzles 230 are pressed into the perforations present along the length of bottom plates 214. These may be arranged in any desired pattern, for example in a single row along the length of the chamber.

As in the case of the previously described embodiment, foamed liquid passes from the first chamber into the second chamber through valved conduit means which permit selective adjustment of the flow rate in various areas along the length of the assembly. To this end there is provided a plurality of tubes 232, the upper ends of which are threaded into the openings of upper chamber 200, and the lower ends of which are threaded into the openings of upper plate 212 of lower chamber 210.

Valve means are provided for controlling the flow through each tube 232 individually.

A simple means of achieving this purpose is to fashion tubes 232 out of a flexible, deformable material such as rubber or plastic and mounting on each tube a pinch clamp, not illustrated, by means of which the flow through the tube may be controlled.

A more durable and precise valve means is that illustrated in the drawings.

Each of tubes 232 mounts a valve 234 which controls the flow of foamed liquid through the tube. The valve may be any one of various conventional valves. It may be, for example, a gate valve operated by means of a screw 236.

Thus in the FIGS. 13 and 14 form of the extrusion head, foamed liquid fed under pressure via pipe 62 into chamber 200 passes through tubes 232 into lower chamber 210 and thence through extrusion openings 230.

The amount of liquid discharged through the openings is determined by the setting of the individual ones of valves 234. Thus a uniform flow, or any desired pattern of non-uniform flow, may be achieved along the length of the extrusion head.

The application of the method of the invention to plywood manufacture is illustrated in FIG. 1.

Two wood veneer preheating lines run at right angles to each other, meeting at a common assembly station. One delivers core, center and back veneers to the assembly station. It comprises an infeed conveyor 120, a heater conveyor 122 and an out feed conveyor 124. The second preheating line comprises a similar conveyor system 126 laid out at right angles to the first.

The first conveyor system conveys to the assembly station a plurality of core veneers 128 and of back and center veneers 130. Conveyor system 126 conveys to the assembly station a plurality of face veneers 132.

As they travel along the conveyor system including conveyor units 120, 122, 124 the core veneers and back and center veneers are preheated with suitable heating units 134. Preferably the heating units comprise infrared heating units capable of heating the veneers to a temperature of from 200° to 400° F. during their time of passage through the heating unit. Singly, the veneers may be heated to this temperature rapidly even though wood is a poor conductor of heat. The contrary is true if it is attempted to heat the veneers in a stack during hot pressing.

As they travel along conveyor system 126, face veneers 132 are preheated to the same temperature level by means of heating elements 136.

Foamed glue is applied to core veneers 128 and back and center veneers 130. The application is made to the upper surface only of these veneers. It is made by means of an extruder head such as heads 70, 70*a*, or 70*b* of FIGS. 2, 10 and 13, respectively. This head applies to the veneers a coating of foamed glue 140 in a pattern determined by the size and dimensions of the extruding orifices.

No adhesive whatsoever is applied to the surface of face veneers 132.

At the assembly station, the core, back, center and face veneers are composited into a plywood assembly 142. This is combined with other panel assemblies to form a press load which is transferred into a press 144 and consolidated into plywood panels. The press may be either a single opening or multiple opening hot press, or a cold press. It is a feature of the invention that by preheating the veneers, it is possible to use a high capacity, single opening cold press at a relatively short time of under 2½ minutes and still effectuate efficient bonding of the veneers into the finished panel.

The method above described has several significant advantages which promise to revolutionize the plywood industry.

First, as noted, since the veneers are preheated, press times are markedly reduced and plant capacity correspondingly increased.

Secondly, since the amount of glue applied to the veneers is independent of the veneer thickness, it may be predetermined accurately without the necessity of over application to insure an adequate bond.

Third, since the glue may be placed accurately on the veneer surface, it need not be spread over trim areas. This effectuates further saving of glue.

Fourth, since the glue in foamed form occupies a relatively large volume, and since it may be applied in the form of filaments or rods having but a limited contact with the hot veneer surface, problems of glue dryout are minimized with concomitant improvement in bond.

Fifth, since but a very short time interval elapses between the introduction of the glue into the system and the pressing of the panels in the press, highly reactive ingredients may be introduced directly into the glue just before it enters the foamer. Such an ingredient comprises, for example, a catalyst added to a thermosetting resin glue, or formaldehyde added to a blood glue.

Sixth, since the foamed glue may be applied in the form of discrete, laterally spaced filaments or rods, multiple extrusion heads may be employed to apply filaments alternately comprising substances which when mixed react chemically with each other. The mixing and reaction then will occur during the press cycle at which time the filaments will be flattened into contact with each other.

This concept may be extended to situation wherein the ensuing reaction is exothermic. Where the reactants comprise a thermosetting resin glue and a catalyst therefor, the two may be applied separately, intermingled in the press, with the ensuing reaction liberating sufficient heat to set the glue. This may be accomplished without the application of heat from an external source so that, for the first time, hot press glues may be used in the manufacture of plywood without the use of a hot press.

An example is a thermosetting resinous condensation product of resorcinol and formaldehyde used with a paraformaldehyde catalyst therefor. Another example is a thermosetting resinous condensation product of phenol and formaldehyde as one component, a thermosetting resinous condensation product of acetone and formaldehyde as a second component, and a catalyst therefor as a third component.

Seventh, by the use of foamed glue as opposed to liquid glues, it is possible to apply the glue by means of extrusion. Extrusion procedures are not easily applicable to liquid glues since the solid fillers and debris which the glues invariably contain, tend to plug the small openings through which the liquid glues necessarily must be extruded. By foaming the glue, and hence by increasing its volume five-fold, it is possible to employ extrusion heads having apertures sufficiently large to avoid this problem.

Eighth, it is possible to control easily and accurately the amount of glue applied to the veneers. This may be accomplished in a major degree by altering the speed of pump 18, or by altering the speed of the conveyor systems conveying the veneers, or by changing extrusion heads 70, or by a combination of these expedients.

Minor variations in spread may be obtained by taking advantage of the fact that the extruded filaments are stretchable. Because of this a surprisingly wide range of spread rates can be had with a given extrusion aperture. Within limits, varying the rate of glue extrusion relative to the speed of veneer conveying, merely causes the applied glue filaments to stretch slightly or condense slightly, without breaking. The necessary control for optimum glue utilization thus is achieved accurately and easily.

Having described our invention in preferred embodiments, we claim:

1. Apparatus for applying foamed liquids to surface, which comprises:

a. positive displacement liquid pump means for continously propelling the liquid in unfoamed condition at a predetermined flow rate, b. liquid foaming means communicating with the pump means for receiving the propelled liquid and foaming it as it is propelled, the foaming means comprising:

1. a generally cylindrical rotor and stator, with the rotor being rotatably mounted within the stator and spaced therefrom,
2. at one end of the stator first and second conduit means arranged for the respective introduction between the rotor and stator in the direction of the axis of rotation of the rotor of (a) unfoamed liquid from the pump means and (b) a foaming gas under pressure,
3. a plurality of radially extending spaced recesses in the opposed cylindrical surfaces of the rotor and stator, the recesses in the rotor being arranged to sweep across the recesses in the stator upon rotation of the rotor, thereby agitating the liquid and gas and foaming the liquid, and
4. third conduit means at the end of the stator opposite said one end for conveying away the resultant foamed liquid, and c. applicator means communicating with the third conduit means for receiving the foamed liquid and applying it continuously to the surface, d. the pump means maintaining the flow rates of the unfoamed and foamed liquids at substantially the same values on a unit weight of liquid per unit time basis.

2. The apparatus of claim 1 for applying foamed plywood glue to wood veneers, the apparatus including a reservoir for containing the glue in liquid, unfoamed condition, the reservoir being connected to the pump means, the liquid foaming means communicating with the pump means and with a source of foam producing gas under pressure, the applicator means comprises extruding means connected to the foaming means for receiving and extruding the foamed glue, and veneer conveyor means arranged relative to the extruding means for conveying wood veneers adjacent the same for depositing the extruded glue on the veneer surfaces.

3. In foamed liquid applying apparatus, an extruder comprising:

a. a laterally elongated first chamber, b. means for connecting the first chamber to a source of foamed liquid under pressure, c. a laterally elongated second chamber, having a plurality of extrusion openings along its length, d. conduit means interconnecting the first and second chambers substantially throughout their lengths, and e. valve means disposed in the conduit means for varying the flow of liquid selectively into different lateral portions of the second chamber as required to produce a predetermined flow of liquid through the extrusion openings.

4. The apparatus of claim 3 wherein the conduit means is elongated laterally, and wherein the valve means comprises adjusting means arranged for adjusting the width of the conduit means in selected locations along its lateral length.

5. The apparatus of claim 3 wherein the conduit means is elongated and wherein the valve means comprises a pair of flexible plates spaced from each other and providing an elongated slot therebetween, and pressure applying means for applying pressure to selected areas of the plates in a direction calculated to flex them relative to each other, thereby altering the width of the corresponding portions of the slot.

6. The apparatus of claim 5 wherein the pressure applying means comprises screw means bearing against the plates.

7. The apparatus of claim 3 wherein the conduit means is elongated laterally and wherein the valve means includes adjustable sealing means for adjustably sealing off the ends of the conduit means.

8. The apparatus of claim 3 wherein the conduit means is elongated laterally and wherein the valve means includes a pair of gate valve members, mounting means slidably mounting the gate valve members one at each end of the conduit means in sealing relation thereto, and adjustment means connected to the gate valve members for adjusting their positions as required to seal off predetermined terminal portions of the conduit means.

9. The apparatus of claim 8 wherein the adjustment means comprises screw means.

10. The apparatus of claim 3 wherein the conduit means comprises a plurality of laterally spaced tubes and wherein the valve means comprises a corresponding plurality of valves one in each tube, for controlling the liquid flow therethrough.

11. The apparatus of claim 3 wherein the conduit means comprises a plurality of laterally spaced tubes and wherein the valve means comprises gate valve means mounted one in each tube.

* * * * *